(12) United States Patent
Wirth

(10) Patent No.: US 7,434,718 B2
(45) Date of Patent: Oct. 14, 2008

(54) DEVICE FOR CUTTING OR WELDING TUBULAR WORKPIECES OR THE LIKE

(75) Inventor: Peter Wirth, Eutingen im Gaeu (DE)

(73) Assignee: Eisenmann Anlagenbau GmbH & Co. KG (DE)

(*) Notice: Subject to any disclaimer, the term of this patent is extended or adjusted under 35 U.S.C. 154(b) by 297 days.

(21) Appl. No.: 10/542,538

(22) PCT Filed: Jul. 8, 2004

(86) PCT No.: PCT/EP2004/007455

§ 371 (c)(1),
(2), (4) Date: Jan. 20, 2006

(87) PCT Pub. No.: WO2005/014218

PCT Pub. Date: Feb. 17, 2005

(65) Prior Publication Data

US 2006/0163317 A1    Jul. 27, 2006

(30) Foreign Application Priority Data

Aug. 1, 2003 (DE) ............................... 103 36 032

(51) Int. Cl.
*B23K 7/00* (2006.01)
*B23K 7/10* (2006.01)

(52) U.S. Cl. ............... 228/44.5; 228/145; 228/147; 228/151; 219/607; 219/60 A (58) Field of Classification Search ............... 228/32, 228/33, 47.1, 44.5, 145, 147, 151; 219/60 A, 219/57, 59.1, 607; 193/35 R; 198/468.11, 198/300, 780, 624; 248/430
See application file for complete search history.

(56) References Cited

U.S. PATENT DOCUMENTS 3,194,611 A * 7/1965 Mahony ....................... 384/24

(Continued)

FOREIGN PATENT DOCUMENTS

| DE | 34 39 431 C3 | 11/1991 |
| DE | 100 27 509 A1 | 12/2001 |
| EP | 0 350 645 A2 | 1/1990 |

*Primary Examiner*—Jessica L Ward
*Assistant Examiner*—Erin P Barry
(74) *Attorney, Agent, or Firm*—Factor & Lake (57) ABSTRACT

The invention relates to a device (1) for cutting or welding tubes (3) or similar workpieces, said device comprising a guiding mechanism which is used to control the cutting or welding torch (17) along a pre-determined line and is provided with a stand-type portal (7). Said portal comprises a through opening (8) into which the workpiece (3) to be machined can be guided in the axial direction. A rotary part (14) can be rotated about the axis of the through opening (8) in a motor-driven manner, guiding a holding arm (16) therewith, which carries the cutting or welding torch (17) on the free end thereof. Said holding arm (16) is fixed to the rotary part (14) and embodied in such a way that the cutting or welding torch (17) moves radially in relation to the axis of the through opening (8) and can be brought into various angular positions in relation to the surface of the workpiece (3). Together with a device (20) which is used to carry out a relative movement between the workpiece (3) and the cutting or welding torch (17) in the axial direction of the through opening (8), the movement of the cutting and welding torch (17) is guided in a controllable manner, whereby it does not only follow a pre-determined line but can also be oriented in various positions in relation to the surface of the workpiece (3) during the entire movement.

12 Claims, 8 Drawing Sheets

U.S. PATENT DOCUMENTS

| | | |
|---|---|---|
| 3,936,714 A | 2/1976 | Marshall et al. |
| 4,345,869 A * | 8/1982 | King .......................... 414/520 |
| 4,365,132 A | 12/1982 | Kazlauskas et al. |
| 4,434,348 A | 2/1984 | Reid |
| 4,739,685 A | 4/1988 | Ricci |
| 5,524,813 A * | 6/1996 | Pease ......................... 228/212 |
| 5,685,996 A * | 11/1997 | Ricci ..................... 219/121.39 |
| 6,571,672 B1 | 6/2003 | Rudd |

* cited by examiner

DEVICE FOR CUTTING OR WELDING TUBULAR WORKPIECES OR THE LIKE

The invention relates to an apparatus for cutting or welding tubular workpieces or the like, having a) a cutting or welding torch;
b) a guiding device for the cutting or welding torch, which device is controllable in such a way that the cutting or welding torch follows a predetermined line.

In modern painting installations, as used in particular for painting vehicle bodies, but also in other industrial installations, large tubing systems used for conveying different media, e.g. air or liquids, are often found. Such tubing systems can comprise several hundred metres of tubes and contain many places at which one tube leads into or branches off from the other or one tube is attached to the other tube at an angle. The envelope-circle diameters, the cross-sectional shapes and the wall thicknesses of the tube sections joined to each other can vary greatly here. Common envelope-circle diameters lie between 30 mm and 600 mm, the cross-sectional shape may in particular be round or rectangular, the wall thickness lies generally between one and ten millimetres.

In one of the two tubes to be joined to each other, an appropriate cutout has to be made, into which the branching-off or leading-in tube is fitted; the branching-off or leading-in tube has to be cut in complementary fashion at its end for this purpose. The accuracy requirements here are extremely high. Cutting accuracies substantially less than 0.5 mm, in some cases even less than 0.2 mm, are desired.

At present, there are no tube-cutting apparatuses available on the market which can satisfactorily meet all the aforementioned requirements at relatively low costs. In principle, it is possible to cut tubes using buckling-arm robots. However, these are not optimally adapted to the geometry of the tubes, are relatively expensive, cannot be readily transferred to a building site and generally do not achieve the desired cutting accuracy either.

Other, commercially available laser cutting apparatuses intended specifically for cutting tubes are suitable only for working relatively thin-walled tubes, since the cutting always takes place perpendicularly to the surface of the tubes. With thicker-walled tubes, this leads to gaping of the cut surfaces of the tube parts to be joined together, which may cause problems when welding.

Similar problems arise with apparatuses used to weld the different precut tubes or tube parts to the tube system, since in this case the welding torch has to be guided in a similar way to the cutting torch when cutting.

The object of the present invention is to configure an apparatus of the type mentioned at the beginning in such a way that it can be used to cut or weld tubular workpieces or the like of greatly varying envelope-circle diameters, greatly varying cross-sectional shapes and greatly varying wall thicknesses.

This object is achieved according to the invention in that the guiding device comprises:

c) a stand-like portal, which for its part has:
 ca) a through opening, into which a workpiece can be guided in the axial direction;
 cb) a rotary part, which is rotatable about the axis of the through opening in a motor-driven manner;
 cc) a holding arm, which at its free end carries the cutting or welding torch and with its other end is fixed in such a way to the rotary part and configured in such a way that the cutting or welding torch can be adjusted radially in relation to the axis of the through opening of the portal and brought into different angular positions in relation to the surface of the workpiece;
d) a device, by which a relative movement between the workpiece and the cutting or welding torch in the axial direction of the through opening can be brought about.

By using the stand-like portal with its through opening, into which the workpiece to be worked can be introduced, and by means of the holding arm which is rotatable about the through opening and carries the cutting or welding torch, the apparatus according to the invention can be easily adapted to the "basic geometry" of tubes or similar workpieces: by rotating the holding arm by means of the rotary part about the axis of the through opening, all the circumferential regions of the workpiece can be easily reached. Through the possibility of feeding the cutting or welding torch in the radial direction, the spacing, required for the working, from the surface of the workpiece can be adjusted in all angular positions about the axis of the through opening. By combining a linear relative movement between the workpiece and the cutting and welding torch and the rotary movement of the cutting and welding torch about the axis of the through opening, any desired working lines on the surface of the workpiece can be obtained. Owing to the property of the holding arm of being movable into different angular positions in relation to the surface of the workpiece, the direction of the working does not need to run perpendicular to the surface of the workpiece. For example, it is possible to perform cuts in which the cutting direction in a spatially fixed coordinate system always remains the same along the entire cutting line. This facilitates the fitting-in of a second workpiece which is to be inserted into the resulting aperture and has been appropriately cut.

The fitting-in may take place, for example, in such a way that the cutting direction bisects the angle at which the two workpieces are to be joined together. Alternatively, it is also possible to conduct the cuts in such a way that when the workpieces are joined together a V-groove results, which is easy to weld.

Preferably, the rotary part rotatable about the through opening of the portal is a ring or a ring segment which is mounted in a guide arranged on one end face of the portal.

The holding arm may comprise, for example, three sections, of which the first extends substantially radially and is mounted so as to be displaceable in this direction by motor, of which the second section is fixed to the first section so as to be rotatable by motor about an axis which runs in the azimuthal direction in relation to the through opening of the portal, and of which the third section is fixed to the second section so as to be rotatable by motor about an axis which runs parallel to the axis of the through opening. The adjustability of the first section provides here the radial feeding of the cutting or welding torch, while the other two sections permit substantially the changing of the orientation of the cutting or welding torch in relation to the surface of the workpiece.

The device for producing the relative movement parallel to the axis of the through opening can be designed in such a way that it can adjust the workpiece in the direction of the axis of the through opening of the portal. Although this configuration simplifies the construction of the portal, it entails having to move the workpiece, which may be relatively heavy.

A device by which the workpiece can be moved in the axial direction in relation to the portal comprises, for example, a carry-along slide, which is movable parallel to the axis of the through opening and can be brought into carry-along connection with the workpiece.

Alternatively, the device by which the relative movement between the workpiece and the cutting or welding torch is brought about is also designed in such a way that it can adjust the welding or cutting torch in the direction of the axis of the through opening of the portal. Admittedly, this means a somewhat more complicated construction of the portal itself; however, since only the lighter welding or cutting torch has to be moved in this case rather than the heavy workpiece which is to be worked, the outlay on apparatus is still acceptable, especially as the high cutting accuracy can be more easily achieved with this configuration.

A preferred example of how the cutting or welding torch can be adjusted parallel to the axis of the through opening is that in which the device in question is formed by the holding arm itself, which for this purpose comprises five interconnected sections,
a) the first section being fixed to the rotary part;
b) the second section being fixed to the first section so as to be rotatable by motor about an axis which runs in the azimuthal direction in relation to the through opening of the portal;
c) the third section being fixed to the second section so as to be rotatable by motor about an axis which likewise runs in the azimuthal direction in relation to the through opening of the portal;
d) the fourth section being fixed to the third section so as to be rotatable by motor about the axis of the third section;
e) the fifth section, which carries the cutting or welding torch, being fixed to the fourth section so as to be rotatable about an axis which runs perpendicular to the axis of the fourth section.

The first three sections of this holding arm enable substantially the radial and axially parallel adjustment of the cutting or welding torch, while the fourth and fifth section serve substantially for bringing about different angular positions of the cutting or welding torch in relation to the surface of the workpiece.

If a holding arm according to claim 3 is used, the device for producing the relative movement can also comprise a slide which is movable by motor parallel to the axis of the through opening and is fixed to the rotary part and to which the holding arm is attached. Here, the relative movement between the workpiece and the cutting or welding torch can thus be brought about by an axial movement of the slide holding the holding arm and hence the cutting and welding torch.

The apparatus according to the invention expediently comprises, on at least one side of the portal, stands which carry a plurality of rollers and on which the workpiece can be laid.

A guide is advantageously provided for the workpieces in the through opening of the portal. In this way, the workpiece can be positioned particularly precisely in that region in which it is worked.

The guide can in this case comprise a plurality of guide rollers which can be laid against the surface of the workpiece.

If these guide rollers can be driven by motor, they can at the same time be used as that device which moves the workpiece in translatory fashion in the required manner parallel to the axis of the through opening of the portal.

The setting of the correct starting position of the workpiece in relation to the rotary ring which brings about the rotary movement of the cutting or welding torch can be facilitated by the fact that the position of the through opening of the portal and hence that of the rotary ring is adjustable in the vertical and/or horizontal direction.

Exemplary embodiments of the invention are explained below with reference to the drawing, in which.

Figure 1:
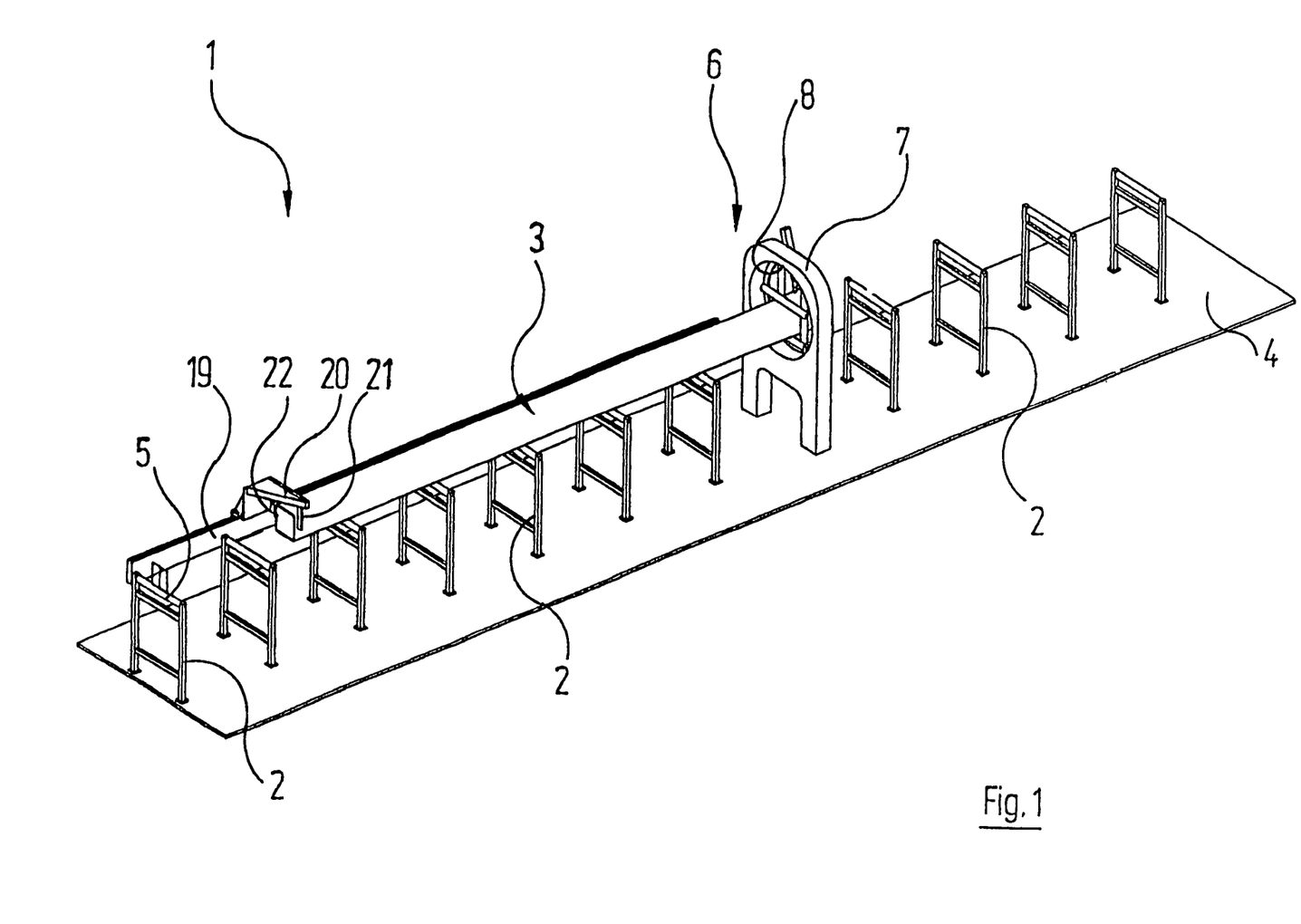
FIG. 1 shows, in perspective, a general view of a first apparatus for cutting tubes.
Figure 2:
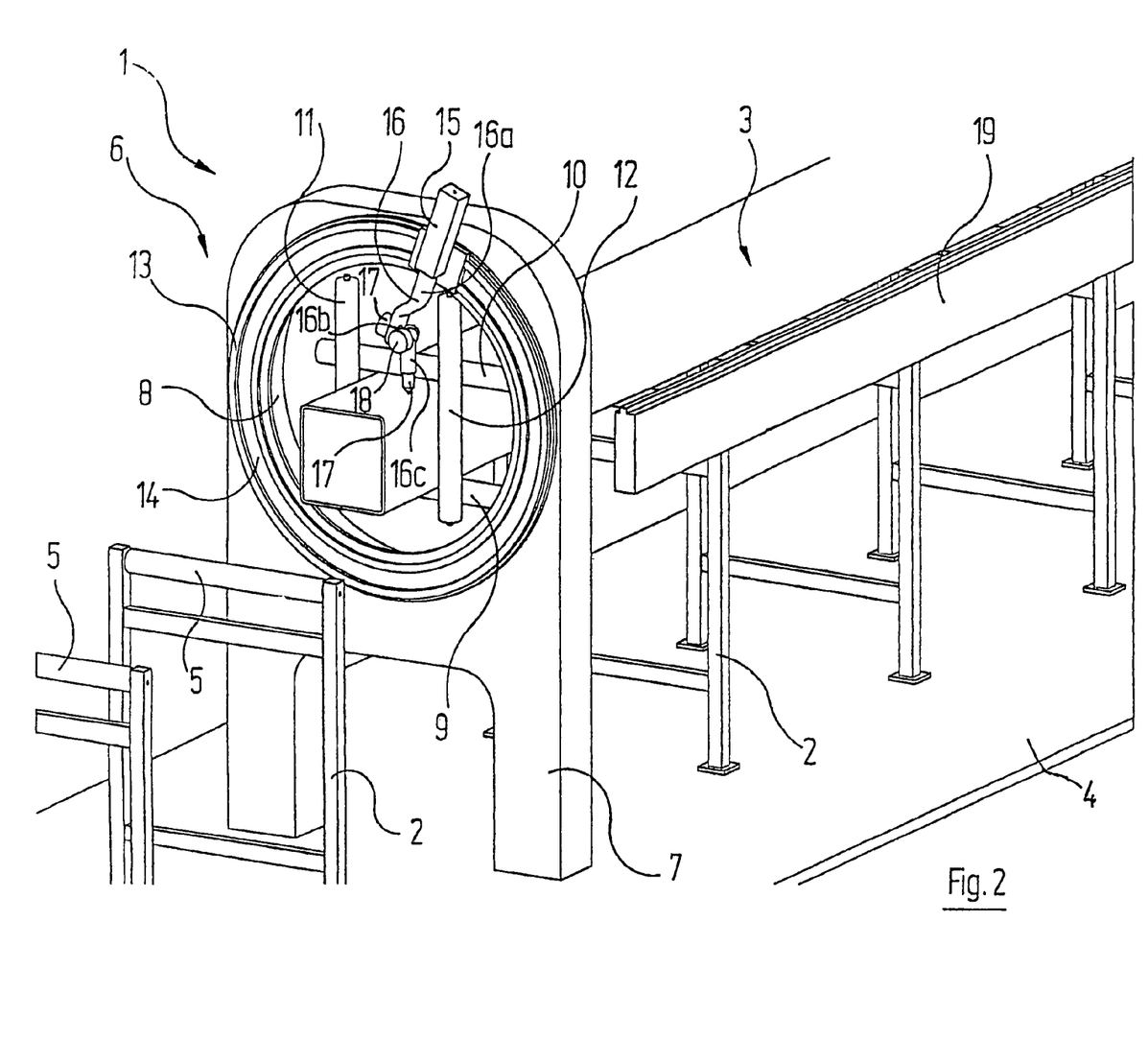
FIG. 2 shows, on an enlarged scale, likewise in perspective, the cutting station of the apparatus of FIG. 1, but seen in the opposite direction.
Figure 3:
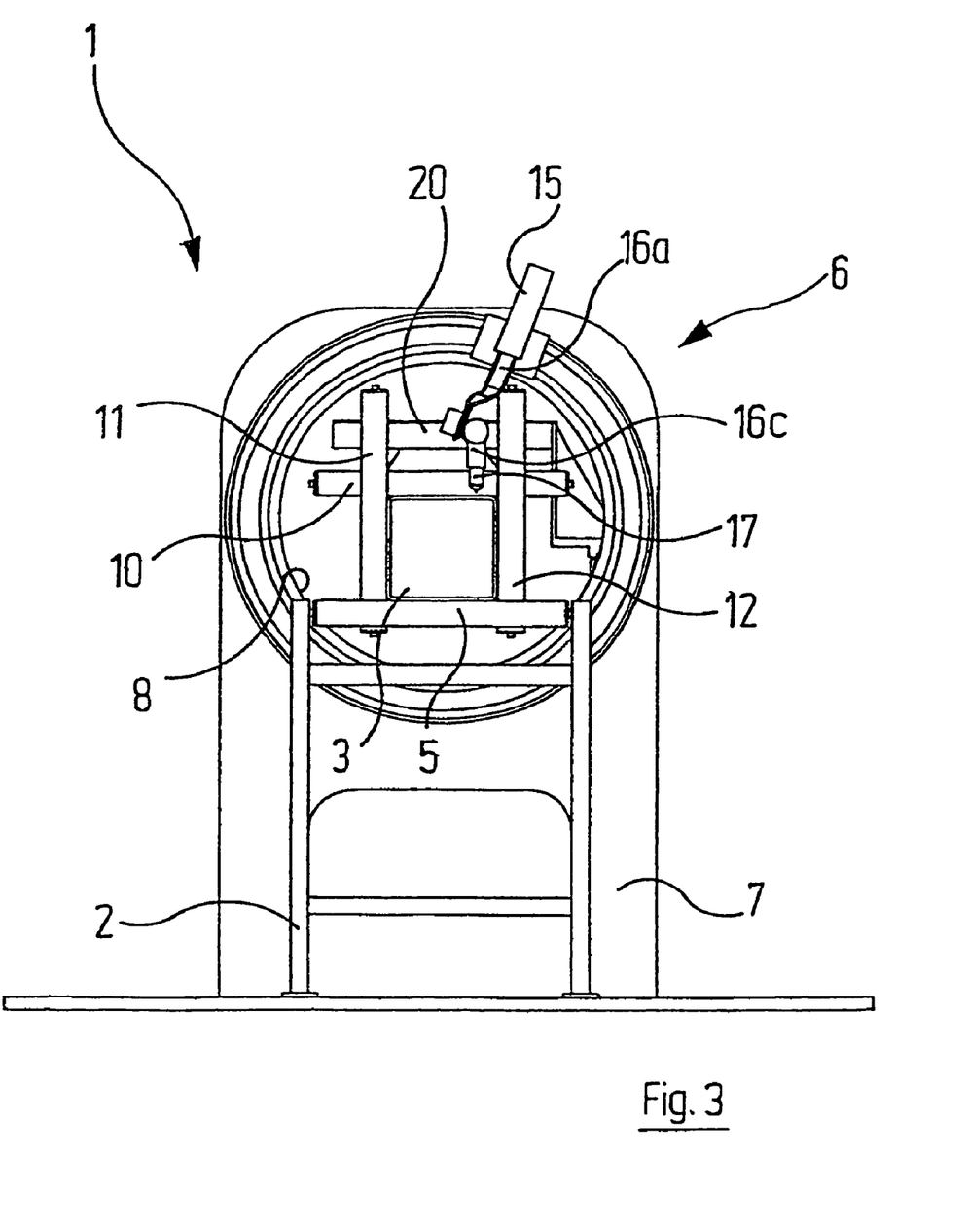
FIG. 3 shows the end view of the cutting station of FIG. 1.
Figure 4:
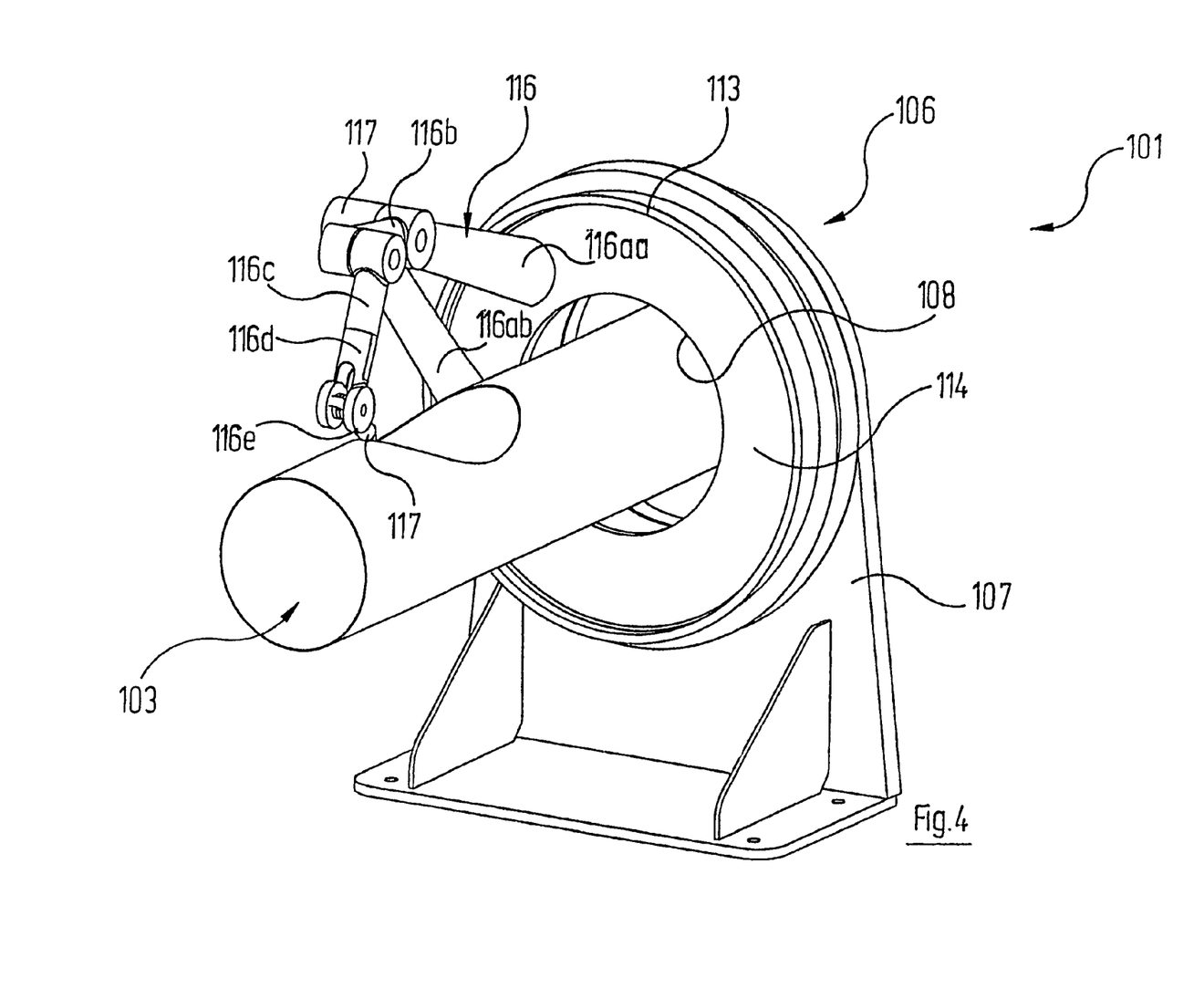
FIG. 4 shows, in perspective, a second exemplary embodiment of a cutting station during the cutting of a circular tube.
Figure 5:
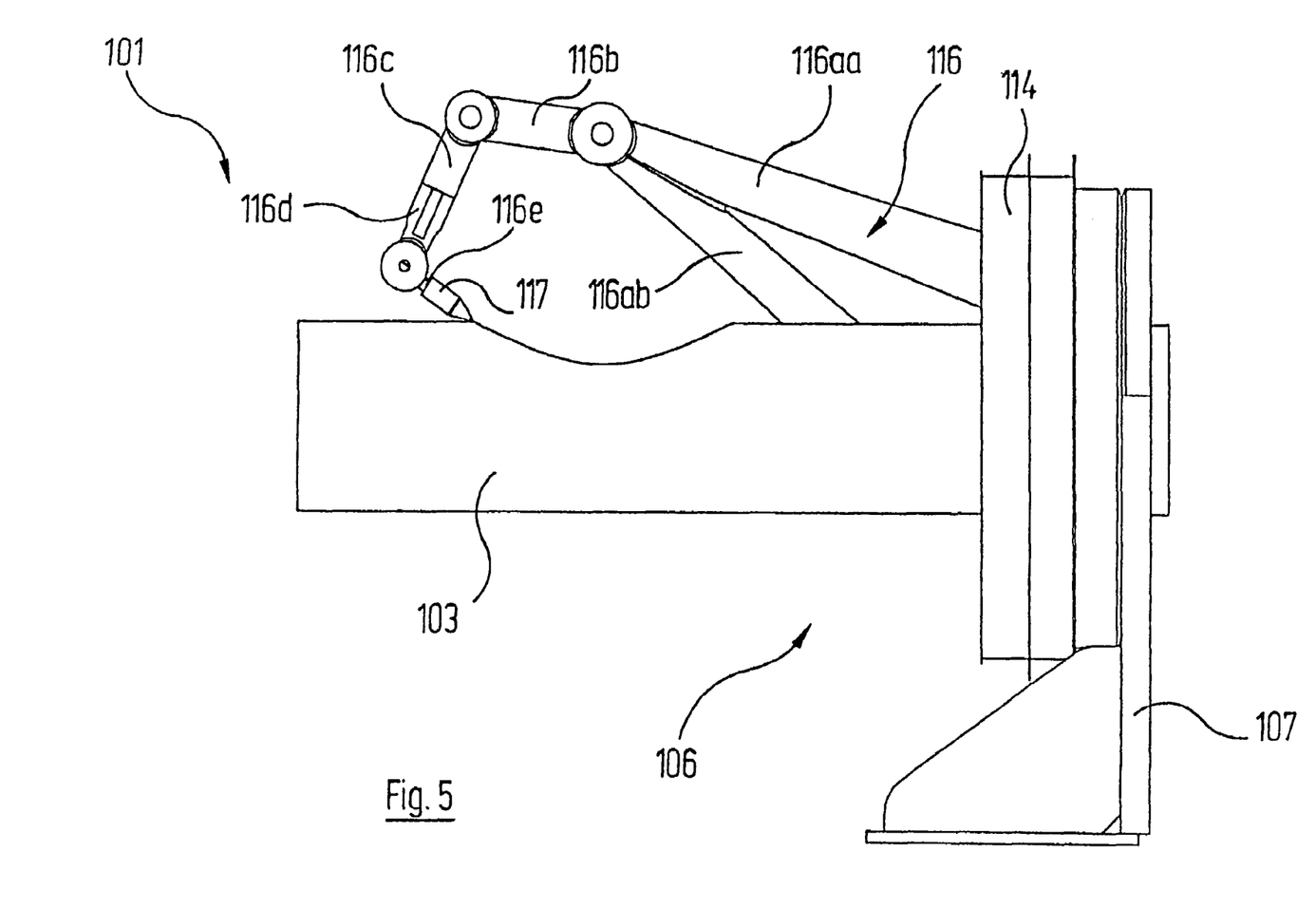
FIG. 5 shows the side view of the cutting station of FIG. 4.
Figure 6:
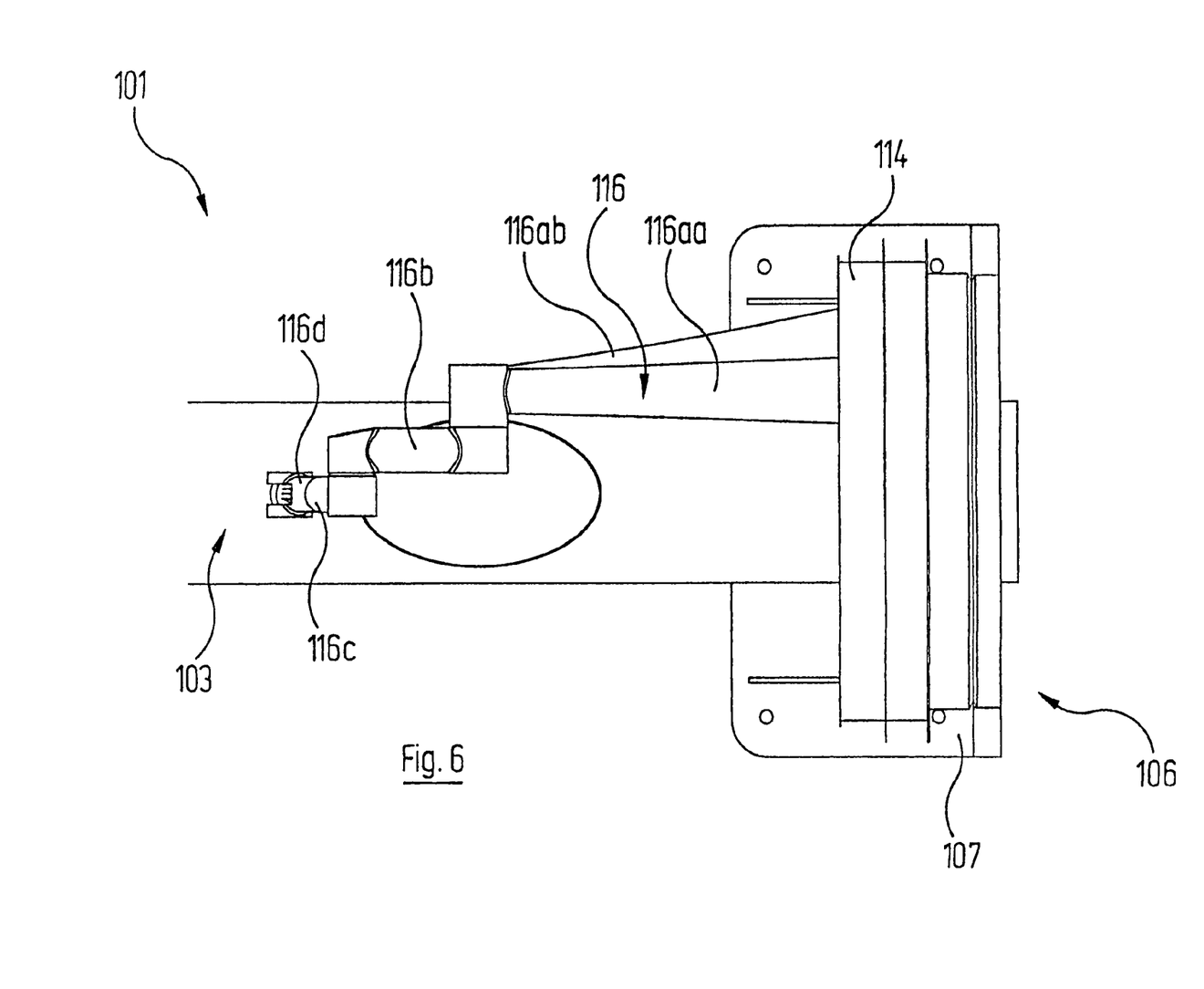
FIG. 6 shows the plan view of the cutting station of FIG. 4.
Figure 7:
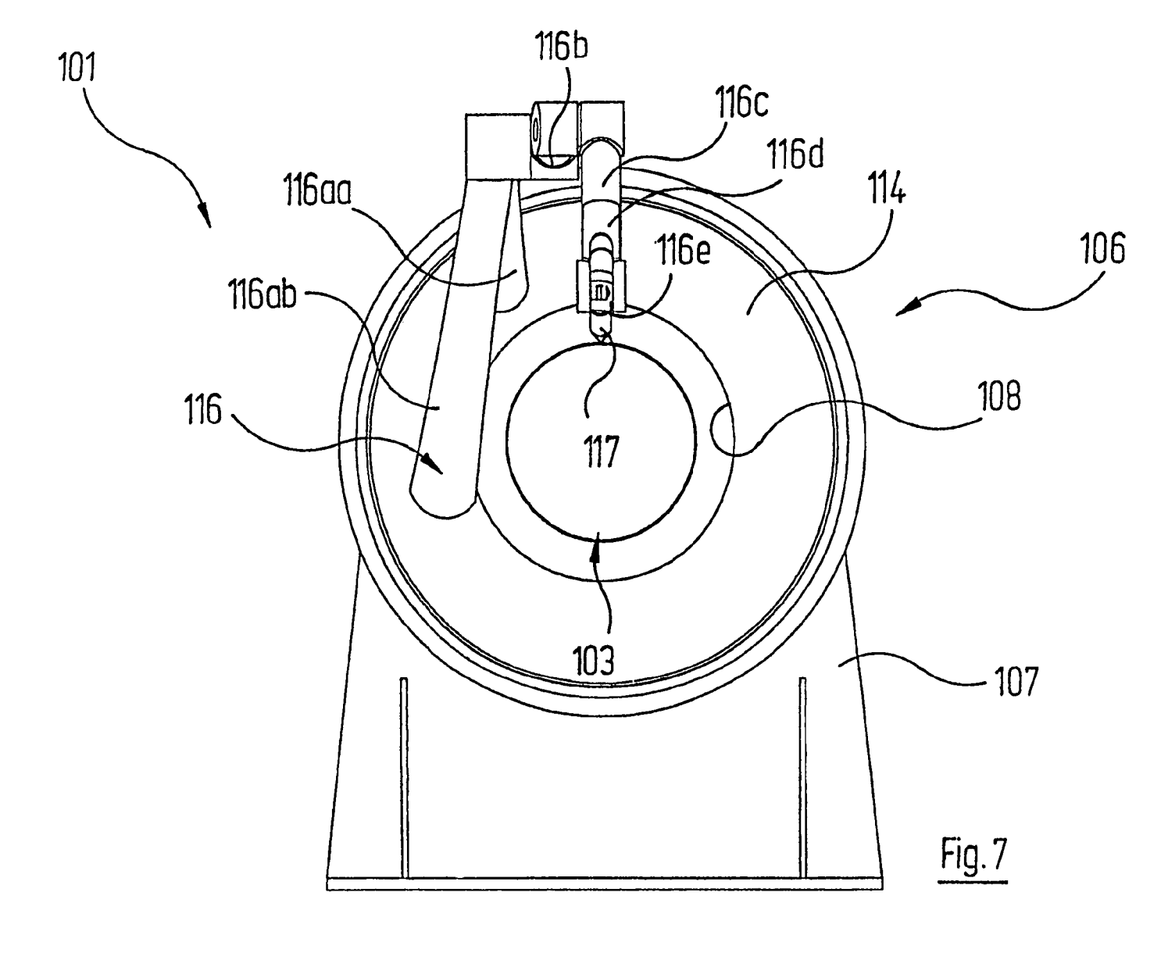
FIG. 7 shows an end view of the cutting station of FIG. 4, seen in the direction of movement of the tubes.

Reference is made first of all to FIGS. 1 to 3, in which a first apparatus, denoted as a whole by the reference symbol 1, for cutting tubes 3 is illustrated. The apparatus 1 comprises a multiplicity of stands 2 which are fixed on the room floor 4 spaced apart from one another in the direction of the longitudinal axis of the tube 3 to be worked. Each stand 2 carries at the top a roller 5 which is rotatable freely or in a motor-driven manner about an axis running perpendicular to the longitudinal axis of the tube 3. The tube 3 is moved in translatory fashion in the direction of its longitudinal axis in a manner described below, with its underside resting on a plurality of rollers 5 of a plurality of stands 2.

The row of stands 2 is interrupted by a cutting station, which bears as a whole the reference symbol 6. The cutting station 6 has a portal 7, likewise mounted on the room floor 4, having a relatively large, circular through opening 8, the axis of which is parallel to the longitudinal axis of the tube 3 and hence to the direction of movement of the latter. In individual cases, the axis of the through opening 8 may be coaxial in relation to the longitudinal axis of the tube 3.

As can be seen in particular from FIGS. 2 and 3, the through opening 8 of the portal 7 is traversed secantly by four guide rollers 9, 10, 11, 12. Two of these guide rollers, namely the guide rollers 9 and 10, run horizontally and perpendicularly to the axis of the through opening 8, while the other two guide rollers, namely the guide rollers 11 and 12, are oriented vertically. The vertical position of the lower horizontal guide roller 9 corresponds to the height of the rollers 5 on the stands 2. The tube 3 thus rests on this lowermost guide roller 9 when passing through the through opening 8. The vertical position of the upper horizontal guide roller 10 is variable, so that it can be laid onto the upper side of the tube 3 depending on the dimensions of the latter. Similarly, the spacing of the two vertical guide rollers 11, 12 is adjustable symmetrically to the vertical mid-plane of the through opening 8 in such a way that the two guide rollers 11, 12 can be laid against the opposite side faces of the tube 3.

The bearings for the different guide rollers 8 to 12 and the means by which the spacing between the pairs of parallel guide rollers 9, 10 and 11, 12 can be varied are not illustrated in the drawing, so as to avoid cluttering the latter.

An annular guide 13 which coaxially surrounds the through opening 8 is mounted on that end side of the portal which faces away from the viewer in FIG. 1 and towards the viewer in FIG. 2. This annular guide 13 bears a rotary ring 14 which can be rotated about its axis and hence also the axis of the annular guide 13 and of the through opening 8 by means of a motor (not illustrated). A mount 15 for a multisection holding arm 16 carrying a cutting torch 17 is fixed to the rotary ring 14. A first section 16a of the holding arm 16 projects in the radial direction from the mount 15 and is linearly adjustable in this direction by a motor accommodated in the mount 15. A second section 16b of the holding arm 16, which section can be rotated about its longitudinal axis with the aid of a motor 17, is mounted on the radially inner end of the section 16a in a manner running perpendicularly thereto and to the axis of the through opening 8 and hence in the azimuthal direction in relation to the through opening 8. A third section 16c, which is rotatable about an axis of rotation running parallel to the axis of the through opening 8 with the aid of a further motor 18, is attached to the opposite end of the second section 16b. The cutting torch 17, already mentioned above, is situated at the end of the third section 16c of the holding arm 16.

A guide rail 19 extends, parallel to the direction of movement of the tube 3, along those stands 2 of the apparatus 1 which are arranged in front of the cutting station 6 in the direction of movement of the tube 3. A carry-along slide 20, which has two vertical clamping jaws 21, 22 running at a variable mutual spacing, is movable on this guide rail 19 by motor (cf. FIG. 1).

The above-described apparatus 1 operates as follows:

First of all, the geometry of the cuts to be made in the tube 3, including the angle at which these cuts have to be made in relation to the surface of the tube 3, is set. Then, the tube 3 to be cut is laid onto the rollers 5 of those stands 2 which lie in front of the cutting station 6 in the direction of movement. The tube 3 is guided, by its front end region, into the through opening 8 of the cutting station 6 and there between the roller pairs 9, 10 and 11, 12 running respectively parallel. These roller pairs have previously been suitably spaced for this. The clamping jaws 21, 22 of the carry-along slide 20 are secured to the trailing end region of the tube 3. Now, the cutting process can take place in accordance with the preset data. For this purpose, first of all by moving the tube 3 in translatory fashion with the aid of the carry-along slide 20, by rotating the rotary ring 14 in relation to the annular guide 13, by radially adjusting the section 16a of the holding arm 16 and by appropriately pivoting the sections 16b and 16c, the cutting torch 17 is brought into that position in which the cutting is to begin and is at the same time inclined in the right direction, so that the cutting takes place at the desired angle in relation to the surface.

Then, the cutting torch 17 is put into operation and the cutting begins. With superimposition of the linear translatory movement of the tube 3, the rotary movement of the rotary ring 14, the linear feed movement of the first section 16a of the holding arm 16, the cutting is now guided along the desired contour. At the same time, by appropriately rotating the sections 16b and 16c of the holding arm 16, the desired angle between the cut and the surface of the tube 3 is continuously adjusted or maintained. During the passage of the tube 3 through the cutting station 6, a plurality of cuts can be made in this way if required.

In an exemplary embodiment which is not illustrated in the drawing, the guide rollers 9 to 12 or at least one of them are motor-driven and thus ensure the linear advance of the tube 3. In this case, the carry-along slide 20 can be dispensed with.

The second exemplary embodiment of an apparatus for cutting tubes, illustrated in FIGS. 4 to 8, bears considerable similarity to the first exemplary embodiment. Corresponding parts are therefore denoted by the same reference symbols plus 100.

The apparatus 101 of FIGS. 4 to 8 has, like the exemplary embodiment described first, a multiplicity of stands with rollers located at the top, on which the tube 103 to be cut can be moved in the direction of its longitudinal axis in front of and behind the cutting station 106. The stands are not illustrated for the second exemplary embodiment. Unlike the exemplary embodiment of FIGS. 1 to 3, that of FIGS. 4 to 8 does not necessarily need to have a carry-along slide for the tube 103 or driven guide rollers in the cutting station 106, since the tube 103 is stationary during the cutting operation. The movement of the tube 103 before and after cutting can optionally also be effected by hand or by the motor-driven rollers of the stands.

The cutting station 106 of the second exemplary embodiment of the cutting apparatus 110 comprises, like that of the first exemplary embodiment, a portal 107 which is provided with a relatively large-area, circular through opening 108. At one end side of the portal 107, the through opening 108 is coaxially surrounded by a rotary ring 114 rotatable by motor in a rotary guide 113. A multisection holding arm 116 for the cutting torch 117 is rigidly fixed to the rotary ring 114 directly, i.e. without the mount 15 of the first exemplary embodiment. The section 116a fastened directly to the rotary ring 114 is configured as a double section for reasons of stability and comprises the two subsections 116aa and 116ab which are each connected at one end to the rotary ring 114 and from there converge to meet in a V shape at the other end.

A second section 116b of the holding arm 116, which section can be rotated with the aid of a motor 117 about an axis running perpendicular to the direction of movement of the tube 103, is fixed to the meeting outer ends of the two subsections 116aa and 116ab. A third section 116c of the holding arm 116 is situated at the end of the second section 116b of the holding arm 116 so as to be rotatable with the aid of a motor 118 about a further axis running perpendicular to the direction of movement of the tube 103. This third section 116c is connected to a fourth section 116d in such a way that the axes of the sections 116c and 116d are aligned with each other and the fourth section 116d can be rotated about this axis by means of a motor (not visible). A fifth section 116e, carrying the cutting torch 117, is in turn attached to the end of the fourth section 116d in such a way that it can be rotated about an axis running perpendicular to the axis of the section 116d with the aid of a motor. The position of the last-mentioned axis in space thus depends on the rotary position of the fourth section 116d in relation to the third section 116c of the holding arm 116.

The mode of operation of the apparatus 110 corresponds largely to that of the apparatus 1 from FIGS. 1 to 4. The main difference is that in the first exemplary embodiment the necessary axial relative movement between the cutting torch 17 and the tube 3 is brought about by a linear translatory movement of the tube 103, while in the second exemplary embodiment the tube 103 is stationary during the cutting and also the component of the movement of the cutting torch 117 required parallel to the axis of the tube 103 is brought about with the aid of the holding arm 116.

The sequence of operations is thus quite similar to that described above for the apparatus 1:

First of all, the tube 103 to be cut is guided, resting on the rollers of the stands (not illustrated in the drawing), into the through opening 108 of the cutting station 106. Then, the correct relative position between the tube 103 and the through opening 108 of the cutting station 106 is established, which can be effected both by manipulation of the tube 103, for example with the aid of the stands (not illustrated), and by manipulation of the cutting station 106 itself. For this purpose, the cutting station 106 can, in whole or in part, be vertically and/or horizontally adjustable. An incorrect position of the tube 103 in relation to the through opening 108 does not need to be corrected in each case. Provided that it is detected with sufficient accuracy by suitable sensors, this incorrect position can also be taken into account computationally.

Now, with the aid of the rotary ring 114 and the various sections 116a to 116d of the holding arm 116, the cutting torch 117 is brought up close in order to begin the cutting and at the same time the cutting torch 117 is oriented in such a way that the cutting can take place at the desired angle to the surface. By superimposition of the rotary movement of the rotary ring 114 and the various pivoting and rotary movements of the individual sections 116a to 116e and hence of the cutting torch 117 itself, the desired cutting line is now travelled along, while the desired inclination of the cutting torch 117 in relation to the surface is continuously maintained.

Figure 8:
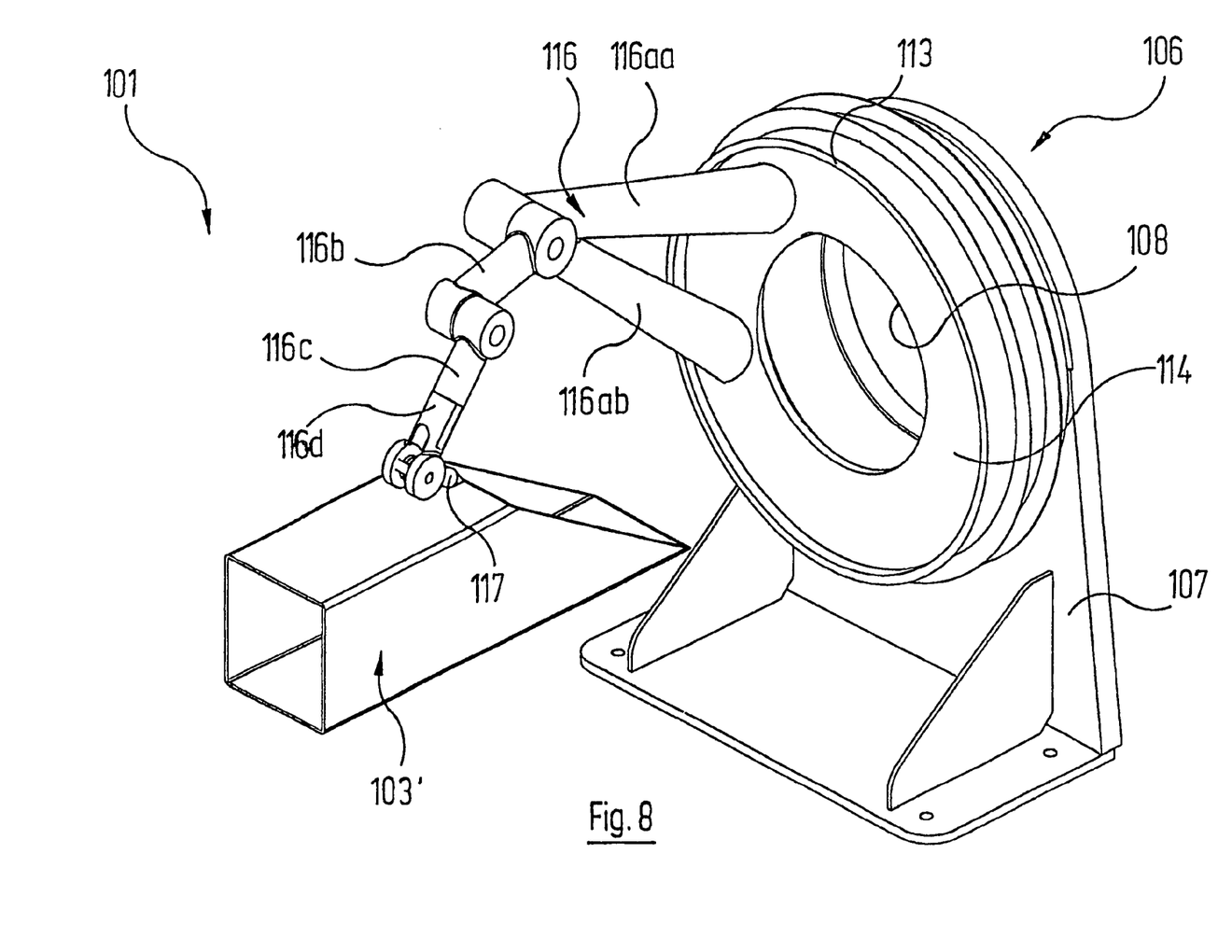
FIG. 8 shows, in perspective, the cutting station of FIG. 4, but during the working of a square tube.

FIGS. 4 to 7 illustrate how an opening is cut into a cross-sectionally circular tube 103 with the aid of the apparatus 110, into which opening a second, branching-off or leading-in tube, which is cut appropriately, can be welded. FIG. 8 illustrates the same apparatus 110, when cutting off in a planar manner a cross-sectionally square tube 103' at a certain angle to the longitudinal axis, so that this tube 103' can be welded to a further tube cut in complementary fashion and extending away at a corresponding angle.

The apparatuses 1 and 101 have been described above in their use for cutting tubes. They can also be used, substantially unchanged, as welding apparatuses, in which case the cutting torches 17 and 117 have to be replaced of course by appropriate welding torches. In addition, provision must be made for apparatuses with which the two tubes to be joined to each other can be held in the correct position against each other. The welding torch then travels, with appropriate superimposition of the various movements which are made possible by the apparatuses 1 and 101, along the butt joint of the tubes to be joined to each other and joins these tubes by an appropriate weld.

The apparatuses described are suitable not only for cutting and welding tubes but also for similar workpieces which have a pronounced longitudinal axis. For example, they can be used to make mitres, positive-locking connections, penetrations and groove cuts on structural-steel or constructional sections or on bar stock, for weld preparation.

The invention claimed is:

1. A guiding apparatus for a cutting or welding torch, which is controllable in such a way that the cutting or welding torch follows a predetermined desired contour, the apparatus comprising:
    a portal including a through opening, into which a workpiece can be guided in an axial direction;
    a rotary part, which is rotatable about the axis of the through opening in a motor-driven manner;
    a holding arm, which at its free end carries the cutting or welding torch and with its other end is fixed in such a way to the rotary part and configured in such a way that the cutting or welding torch can be adjusted radially in relation to the axis of the through opening of the portal and brought into different angular positions in relation to the surface of the workpiece, wherein the holding arm comprises three sections, of which a first section extends substantially radially and is mounted so as to be displaceable in this direction by motor, of which a second section is fixed to the first section so as to be rotatable by motor about an axis which runs in the azimuthal direction in relation to the through opening of the portal, and of which a third section is fixed to the second section so as to be rotatable by motor about an axis which runs parallel to the axis of the through opening; and,
    a device, by which a relative movement between the workpiece and the cutting or welding torch in the axial direction of the through opening can be brought about.

2. The guiding apparatus of claim 1, wherein the rotary part rotatable about the through opening is a ring or a ring segment which is mounted in a guide arranged on one end face of the portal.

3. The guiding apparatus of claim 1 wherein the device for producing the relative movement is designed in such a way that it can adjust the workpiece in the direction of the axis of the through opening of the portal.

4. The guiding apparatus of claim 3, wherein the device for producing the relative movement comprises a carry-along slide, which is movable parallel to the axis of the through opening and can be brought into carry-along connection with the workpiece.

5. The guiding apparatus of claim 1, wherein the device for producing the relative movement is designed in such a way that it can adjust the cutting or welding torch in the direction of the axis of the through opening of the portal.

6. The guiding apparatus of claim 4, wherein the device for producing the relative movement is formed by the holding arm, which for this purpose comprises five interconnected sections,
    the first section being fixed to the rotary part;
    the second section being fixed to the first section so as to be rotatable by motor about an axis which runs in the azimuthal direction in relation to the through opening of the portal;
    the third section being fixed to the second section so as to be rotatable by motor about an axis which likewise runs in the azimuthal direction in relation to the through opening of the portal;
    the fourth section being fixed to the third section so as to be rotatable by motor about the axis of the third section; and,
    the fifth section, which carries the cutting or welding torch, being fixed to the fourth section so as to be rotatable about an axis which runs perpendicular to the axis of the fourth section.

7. The guiding apparatus of claim 1 wherein a guide is provided for the workpiece in the through opening of the portal.

8. The guiding apparatus of claim 7, wherein the guide comprises a plurality of guide rollers which can be laid against the surface of the workpiece.

9. The guiding apparatus of claim 8, wherein the guide rollers can be driven by motor.

10. The guiding apparatus of claim 1 wherein the position of the through opening is adjustable in the vertical and/or horizontal direction.

11. A guiding apparatus for a cutting or welding torch, which is controllable in such a way that the cutting or welding torch follows a predetermined desired contour, the apparatus comprising:
    a portal including a through opening, into which a workpiece can be guided in an axial direction;
    a rotary part, which is rotatable about the axis of the through opening in a motor-driven manner;
    a holding arm, which at its free end carries the cutting or welding torch and with its other end is fixed in such a way to the rotary part and configured in such a way that the cutting or welding torch can be adjusted radially in relation to the axis of the through opening of the portal and brought into different angular positions in relation to the surface of the workpiece; and,
    a device, by which a relative movement between the workpiece and the cutting or welding torch in the axial direction of the through opening can be brought about, wherein the device for producing the relative movement comprises a carry-along slide that is designed in such a way that it can adjust the workpiece in the direction of the axis of the through opening of the portal and which is movable parallel to the axis of the through opening and can be brought into carry-along connection with the workpiece.

12. A guiding apparatus for a cutting or welding torch, which is controllable in such a way that the cutting or welding torch follows a predetermined desired contour, the apparatus comprising:
- a portal including a through opening, into which a workpiece can be guided in an axial direction;
- a rotary part, which is rotatable about the axis of the through opening in a motor-driven manner and wherein the rotary part rotatable about the through opening is a ring or a ring segment which is mounted in a guide arranged on one end face of the portal;
- a holding arm, which at its free end carries the cutting or welding torch and with its other end is fixed in such a way to the rotary part and configured in such a way that the cutting or welding torch can be adjusted radially in relation to the axis of the through opening of the portal and brought into different angular positions in relation to the surface of the workpiece, wherein the holding arm comprises three sections, of which a first section extends substantially radially and is mounted so as to be displaceable in this direction by motor, of which a second section is fixed to the first section so as to be rotatable by motor about an axis which runs in the azimuthal direction in relation to the through opening of the portal, and of which a third section is fixed to the second section so as to be rotatable by motor about an axis which runs parallel to the axis of the through opening; and,
- a device, by which a relative movement between the workpiece and the cutting or welding torch in the axial direction of the through opening can be brought about.

* * * * *